Aug. 15, 1961   R. B. FEUCHTBAUM   2,996,693
COATED ELECTRICAL STRUCTURE
Filed Oct. 13, 1954   2 Sheets-Sheet 1
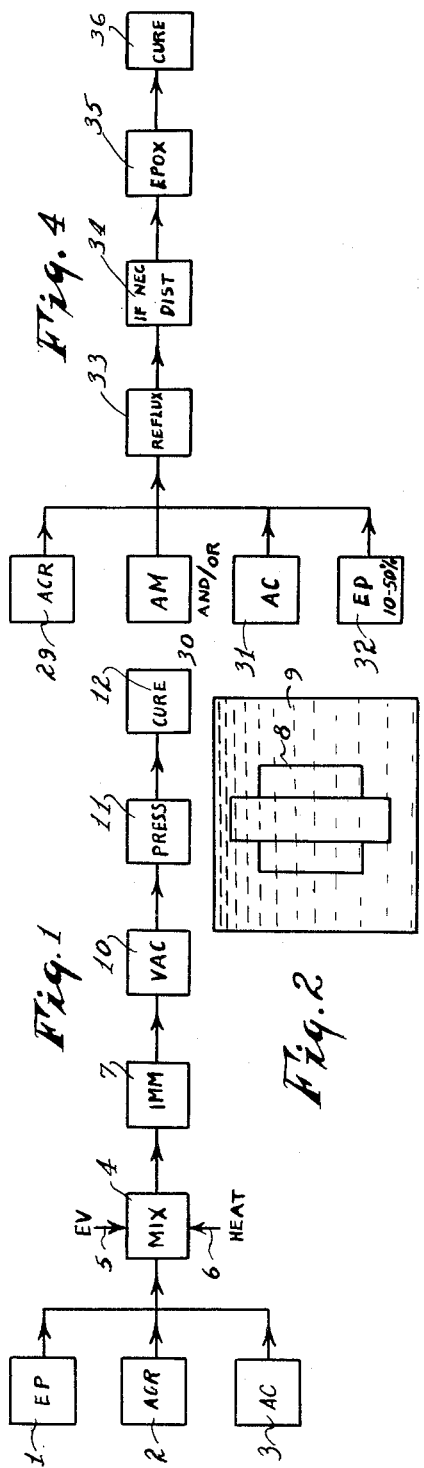
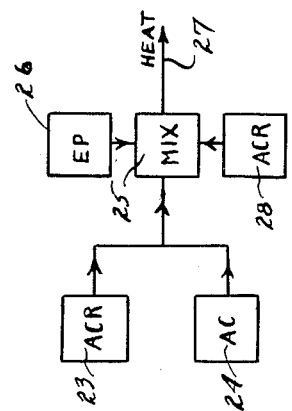
INVENTOR.
ROBERT BERNARD FEUCHTBAUM
ATTORNEY Aug. 15, 1961  R. B. FEUCHTBAUM  2,996,693
COATED ELECTRICAL STRUCTURE
Filed Oct. 13, 1954  2 Sheets-Sheet 2
EPOXY REACTIONS WITH ACID ANHYDRIDE
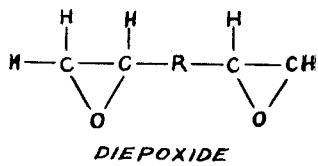
DIEPOXIDE
+
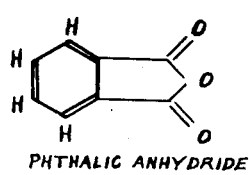
PHTHALIC ANHYDRIDE
*Fig. 5*
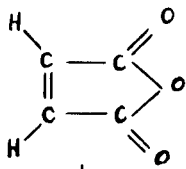
MALEIC ANHYDRIDE
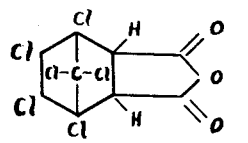
'HET' ANHYDRIDE
OR
HEXACHLOROENDOMETHYLENE TETRAHYDROPHTHALIC ACID ANHYDRIDE
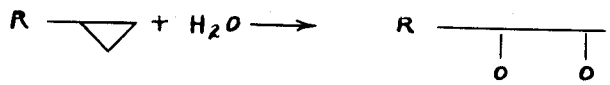
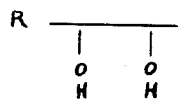
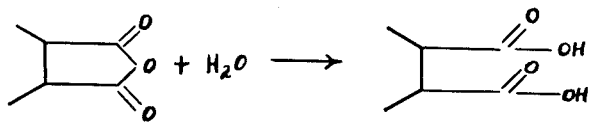
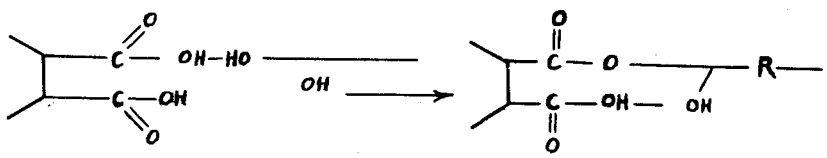
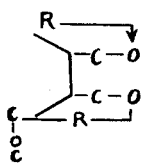
INVENTOR.
ROBERT BERNARD FEUCHTBAUM
BY
*Theodore Houghey*
ATTORNEY

United States Patent Office 2,996,693
Patented Aug. 15, 1961

2,996,693
COATED ELECTRICAL STRUCTURE
Robert Bernard Feuchtbaum, Brooklyn, N.Y., assignor to Freed Transformer Co., Inc., Brooklyn, N.Y., a corporation of New York
Filed Oct. 13, 1954, Ser. No. 462,091
1 Claim. (Cl. 336—96)

This invention relates to sealing of electrical structures and more specifically to materials and processes for the sealing of electro-conducting structures such as reactances and transformers.

One of the objects of the invention is a sealed product and a sealing material including a substantial percentage of a condensation product of an epoxyresin and acrylonitrile.

Another object of the invention is a polymerization product of a polyfunctional preferably unsaturated acid anhydride, an epoxy resin monomer and acrylonitrile.

Further object of the invention is a polymerization product of a polyfunctional preferably unsaturated acid anhydride, an epoxy resin monomer, acrylonitrile, using organic peroxide catalyst.

Still further an object of the invention is a sealed product derived from a sealing process in which during polymerization the essential components of the sealing material are caused to react in one step only and thereafter molding or potting, impregnation or immersion, or capsulation, or any other type of sealing formation is caused to occur.

In an alternative sealing product the essential components are caused to react in several successive steps, for example, first acid, or acid and amine and acrylonitrile are caused to react with each other and thereafter in a separate and subsequent step this mixture is caused to react with the epoxy resin monomer.

These and other objects of the invention will be more fully understood from the drawings enclosed herewith, in which:

FIG. 1 represents schematically an impregnation process sequence manufacturing a product embodying certain principles of the invention.

FIG. 2 represents an impregnation product.

FIG. 3 represents another process embodying features of the invention.

FIGS. 4 and 5 illustrate certain other reactions involved in some of the process steps characteristic of the invention.

Generally certain predetermined quantities of epoxy or ethoxylene resin monomer in the form of Shell No. 828 as described for example in Shell Chemical Corporation Price Schedule dated August 28, 1953, the Technical Bulletins of Shell Chemical Corporation No. SC: 52–14, SC: 52–6 and the Shell Chemical Corporation booklet entitled "Epon Resins for Surface Coatings," Technical Publication SC: 52–31 or Ciba No. 504 such as described for example in the Ciba catalog, Technical Data Bulletin No. 8. See pages 1, 3, 6 for Araldite 504 and a polybasic acid, and also with a predetermined amount of acrylonitrile depending upon the viscosity, hardness, brittleness and any other desired mechanical or electrical properties of the final condensation or impregnation product.

The result is a condensation or impregnation product which after proper heating and if necessary under pressure, sometimes preceded by a rapid evacuation is polymerized and after polymerization exhibits perfect adherence to the electro-conductive material to the exclusion of air and other gas pockets.

Exclusion of such gas formation is enhanced if in accordance with this invention pressure application is preceded by a relatively short period of appropriate evacuation. At the same time by proper dosation of the components especially acrylonitrile the exterior of the polymerization product can be made of any practically desirable hardness or elasticity and substantially independent from temperature changes within a relatively wide range of temperature.

In a preferred procedure involving cyanoethylating of the epoxy, its hydroxyl, keton, and aldehyde structures, or any of them is modified by the reaction in accordance with the invention.

In a specific realization of the invention, resulting in a practically bubble free, almost fibrous structure, having a minimum of acrylonitrile, the acrylonitrile, and amine are reacted first with application of as much heat as required by the more or less exothermic nature of the mixing. Thereafter, if necessary, the mixture is freed from unreacting acrylonitrile by fractional distillation, and thereafter the epoxy monomer is added and polymerization is caused to occur.

In case vacuum is used first and pressure applied thereafter, then vacuum is applied for a very short time only, i.e. until the moment the mixture just starts boiling.

In a particular example 120 pounds per square inch compression is applied whereby either compressed air or a neutral or non-reactive gas such as nitrogen is used.

The temperature applied for polymerization during a varnishing process is 40 degrees centigrade.

When using the mixture for casting or molding transformers, the mold should be pre-treated with a well-known release solution, to permit rapid removal of the impregnated electro-conductive structure. At the same time a filler is added to the molding material such as powdered aluminum, diatomaceous earth, slate, Orlon, Dacron or Teflon.

It is also believed that the particular effect or at least one of the effects characteristic of the invention is due to the fact that ten to thirty percent of the acrylonitrile used in the composition in addition to stabilizing the reaction and the final product serves as a wetting agent increasing the capillary action of the electro-conductive or electro-insulating elements of the electro-conductive structure such as a transformer.

In practice it has been found that an evacuation of the order of a few, for example, ten seconds has been found sufficient because then the relatively low vapor pressure of the acrylonitrile causes rapid evaporation or at least boiling thus permitting prompt recognition of the proper time elements indicative for example of the ready dissolution occurring of a dibasic acid in the acrylonitrile.

As a preliminary reaction a dibasic acid and acrylonitrile are mixed and heated under reflux then the epoxy monomer is added.

To increase the heat distribution of the epoxy resin a polybasic acid is added in the form of hexachloroendo-methylenetetrahydrophthalic acid in accordance with the invention.

It is further believed that there are several competing reactions or double polymerization occurring in this process of polymerization characteristic of the invention. There is for example in a particular instance involving benzoylperoxide as a catalyst, and an alkyd as well as an epoxy plastic.

As more clearly apparent from FIG. 1, certain predetermined quantities of epoxy resin Shell 828, acrylonitrile and a polybasic acid represented in the form of blocks 1, 2 and 3 are mixed at 4, evacuated at 5, heated at 6, and thereafter at 7 used in immersion process for the impregnation, coating or varnishing of a transformer such as indicated in FIG. 3 at 8 immersed in a vessel 9. Thereafter as indicated in FIG. 1 at 10 vacuum is applied for a very short time and thereafter at 11 immediately pressure of 120 pounds for ¾ of an hour sufficient to achieve and terminate the polymerization process as indicated at 12 by curing for 3 or 4 hours at 120 degrees centigrade, or for about 12 hours at 60 degrees centigrade.

Alternatively pressure application and curing can be combined by heating at between 60 and 120 degrees centigrade under 150 to 200 pounds pressure for 3 to 4 hours.

In application of this process where acrylonitrile is mixed together with epoxy resin monomer and an unsaturated polyfunctional acid such as maleic acid anhydride involving a cyanoethylation in the presence of benzoyl peroxide, the polymerized product becomes rather brittle and requires a plasticizer or filler such as Teflon powder.

In a modification of the invention, where again Shell 828 or Ciba 504 is used as an epoxy resin monomer, maleic acid anhydride or phthalic acid anhydride together with hetanhydride (hexachloroendomethylenetetrahydrophthalic acid anhydride) are added. In this case for 100 parts of epoxy resin monomer are combined with 30% to 40% of maleic acid anhydride or phthalic acid anhydride or with 75% of the het-anhydride compound while 20%–30% acrylonitrile is applied, preferably 20% acrylintrile for the maleic or phthalic acid anhydrides and 30% acrylonitrile for the het-anhydride.

All these components can be reacted simultaneously or in selected steps.

In case dip coating or capsulation is used there is a short evacuation preceding the dip coating until the entire mixture froths and then pressure is applied for about one half-hour until polymerization takes place. Then the dipped article is dried in an oven.

In this case and preferably in the case of molding it has been found economical to preheat the unit to be impregnated at say 120 degrees centigrade. The invention is not limited to the impregnation, coating, molding, potting or capsulation of other electroconductive structures such as diodes or transistors but can be used for any other purpose where mechanical, electrical and thermal stability or temperature independence are required as for example in the case of household articles.

In the alternative process shown in FIG. 3 the mixture and reaction of the components is caused to occur in several successive steps.

In a first step for example, applicable to the process of FIG. 1, the acrylonitrile and the acid derived from 22, 23 are mixed at 24 at room temperature by letting it stand for 24 hours or refluxed if necessary with 10 to 50% by weight of epoxy monomer. This increases viscosity and decreases exothermic reaction; it also enables the resin to "B-stage" i.e. to arrive at a semicured or thermoplastic stage, from which it can be polymerized in a separate and subsequent operation for example in injection molding.

Then the epoxy monomer is added at 26 and thereafter the mixture can be heated at 27 or treated in the manner previously described and illustrated or in any other appropriate manner without departing from the scope of this disclosure.

In FIG. 5 acrylonitrile and amine are mixed at 29 and 30 respectively, reacted with the addition of acid and epoxy at 31, 32 respectively and with application of heat if necessary under reflux at 33, then if necessary fractionally distilled at 34, to remove unreacted acrylonitrile, whereupon epoxy monomer is added at 35 and polymerization or curing caused to occur at 36 in any of the manners indicated above. The result is a relatively light weight translucent polymer, which is free of bubbles and exhibiting on scratching a fiber-like texture, lending itself excellently to be molded around transformers or other electro-conductive structure.

When using maleic and anhydride or "het"-anhydride (hexachloroendomethylenetetrahydrophthalic acid anhydride) a definite plasticizing action or effect has been observed, apparently due to these acids having reactable double links as more clearly apparent from FIG. 5 which illustrates reactions between the acrylonitrile and the het-anhydride.

The invention is not limited to the use of acrylonitrile or polyacrylonitrile. Any other compound including or coupled to or derived from acrylonitrile may be used for the purpose of this invention and without departing from its scope.

Thus, in a further modification of the invention instead of acrylonitrile, alphatrifluoromethylacrylonitrile is used with difluorotetrachloroendomethylenetetrahydrophthalic acid anhydride, which is the fluorine analog of het-anhydride.

The fluorine content makes the resulting polymerization product still more heat resistant and especially increases its flameproofness.

Under the impact of direct heat or flame it will only char.

In another modification the molecules of the resinous compound during reaction can be orientated for example exposed to an electrostatic field to enhance certain electric and/or mechanical characteristics of the product.

I claim:

An electro-conductive structure having reactance comprising an electro-conductive coil wound over a magnetic element, a coating thereon consisting of a condensation product of an epoxy resin, acrylonitrile of the order of 10 to 30% in weight of epoxy resin and at least a similar amount of a complex poly-functional acid.

References Cited in the file of this patent

UNITED STATES PATENTS

| | | |
|---|---|---|
| 2,512,996 | Bixler | June 27, 1950 |
| 2,602,785 | Wiles et al. | July 8, 1952 |
| 2,604,464 | Segall et al. | July 22, 1952 |
| 2,633,458 | Shokal | Mar. 31, 1953 |
| 2,707,177 | Skiff | Apr. 26, 1955 |
| 2,785,383 | Foster | Mar. 12, 1957 |